(12) United States Patent
Kahlon et al.

(10) Patent No.: US 10,486,830 B2
(45) Date of Patent: Nov. 26, 2019

(54) LAUNCHER FOR UNMANNED AERIAL VEHICLES

(71) Applicant: UVISION AIR LTD, Zur Igal (IL)

(72) Inventors: Moshe Kahlon, Kfar Yona (IL); Shlomo Hakim, Kfar Yona (IL)

(73) Assignee: UVISION AIR LTD, Zur Igal (IL)

( * ) Notice: Subject to any disclaimer, the term of this patent is extended or adjusted under 35 U.S.C. 154(b) by 85 days.

(21) Appl. No.: 15/755,699

(22) PCT Filed: Aug. 25, 2016

(86) PCT No.: PCT/IL2016/050936
§ 371 (c)(1),
(2) Date: Feb. 27, 2018

(87) PCT Pub. No.: WO2017/037699
PCT Pub. Date: Mar. 9, 2017

(65) Prior Publication Data
US 2018/0244402 A1    Aug. 30, 2018

(30) Foreign Application Priority Data

Sep. 1, 2015 (IL) .......................................... 241024

(51) Int. Cl.
*B64F 1/04* (2006.01)
*B64C 39/02* (2006.01)
(52) U.S. Cl.
CPC .............. *B64F 1/04* (2013.01); *B64C 39/024* (2013.01); *B64C 2201/08* (2013.01); *B64C 2201/102* (2013.01); *B64C 2201/201* (2013.01)
(58) Field of Classification Search
CPC . B64F 1/04; B64F 1/06; B64C 39/024; B64C 2201/08; B64C 2201/102; B64C 2201/201
See application file for complete search history.

(56) References Cited

U.S. PATENT DOCUMENTS

| | | | |
|---|---|---|---|
| 8,505,430 B2* | 8/2013 | Miralles | B64C 39/024 89/1.816 |
| 8,662,441 B2* | 3/2014 | Powell | B64C 39/024 244/62 |

FOREIGN PATENT DOCUMENTS

WO    WO 2015/127178    8/2015

\* cited by examiner

*Primary Examiner* — Justin M Benedik
(74) *Attorney, Agent, or Firm* — Law Offices of Steven W. Weinrieb

(57) ABSTRACT

A launcher for unmanned aerial vehicles (UAV), the launcher having a foldable UAV stowed within said launcher, the launcher includes, a launch tube configured as a UAV launcher and a UAV carrying case. The launcher further includes a pneumatic booster connected to said UAV for accelerating said UAV during launching phase. The launcher further includes a separation mechanism operated to permits separation of the booster from the UAV when the UAV leaves the launcher tube and to transfer the kinetic energy that is created from the pneumatic booster to the UAV in the launching phase. The UAV is propelled off of the launch tube by the booster that transmits thrust in the launch tube to the space below said booster. The UAV which is connected to the booster by the separation mechanism is pushed out of the launcher tube body and leaves the launch tube, the booster is separated from the UAV by the separation mechanism and the UAV is automatically deployed. The UAV propellers are activated to propel the UAV and driven the UAV.

27 Claims, 11 Drawing Sheets

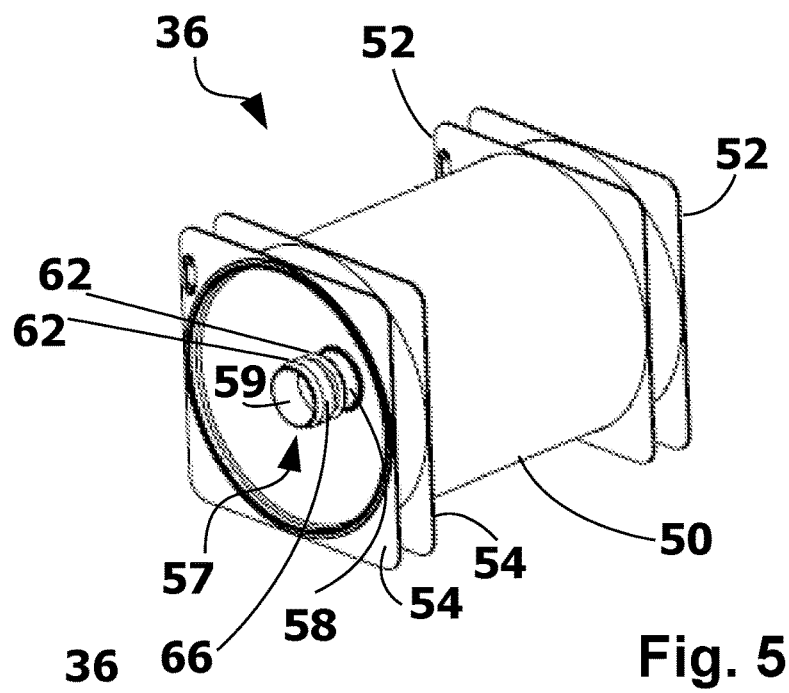
Fig. 5
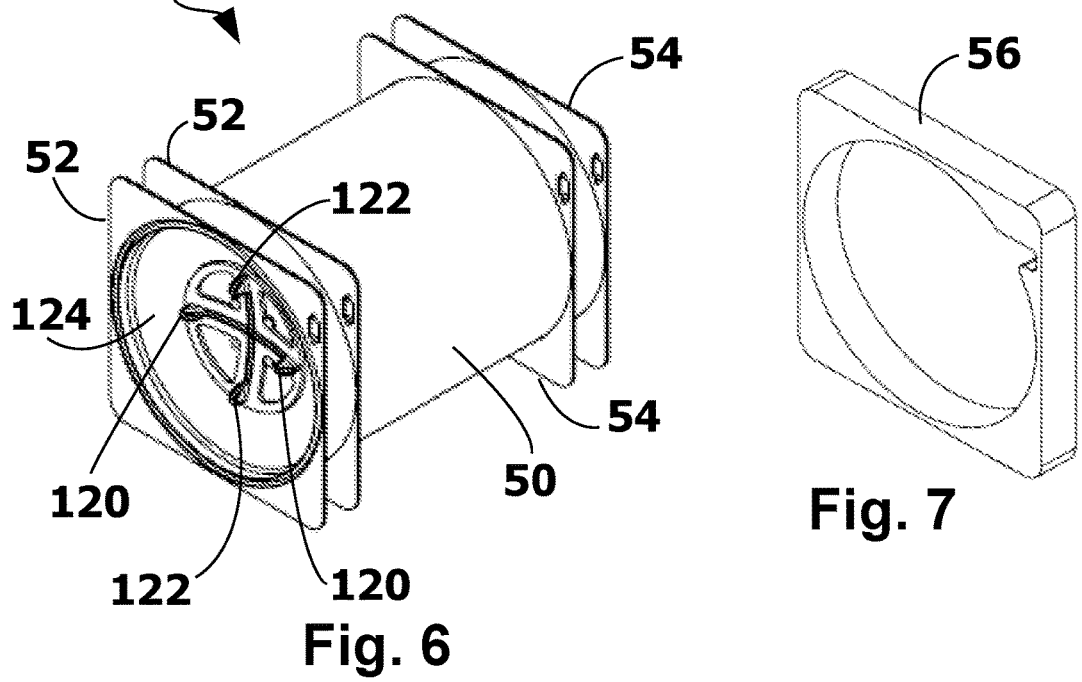
Fig. 6
Fig. 7

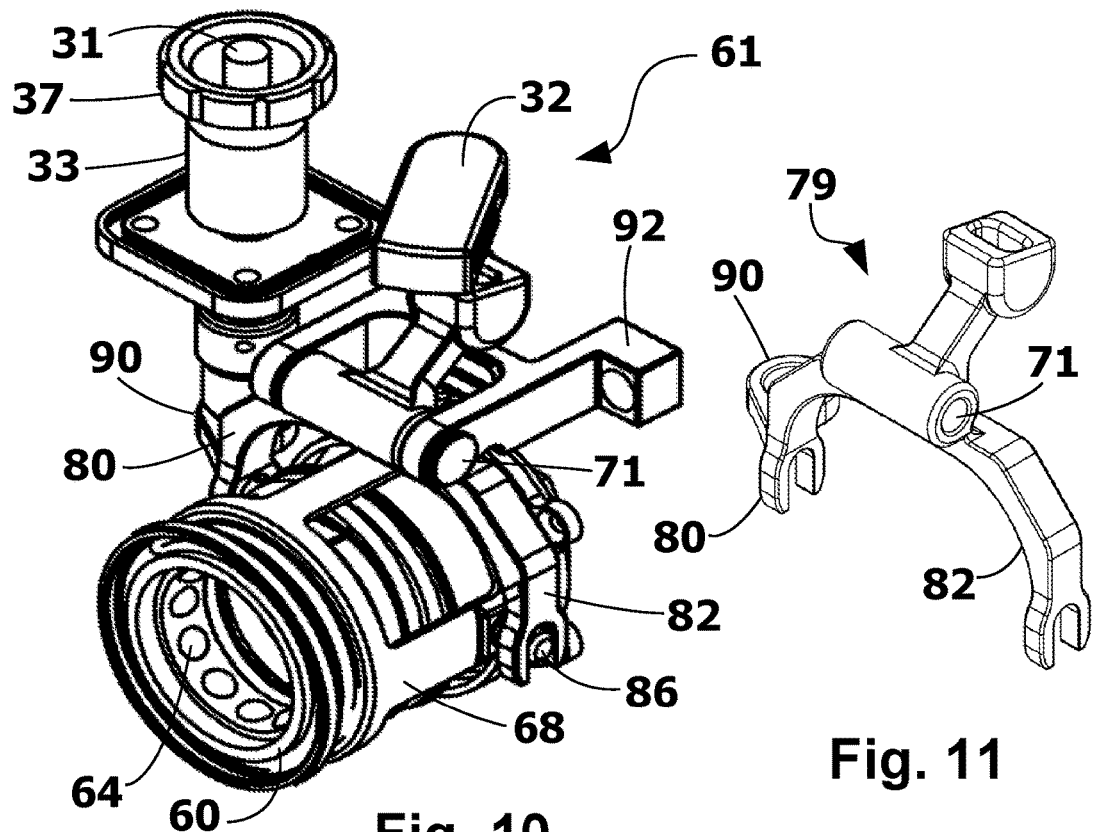
Fig. 10
Fig. 11
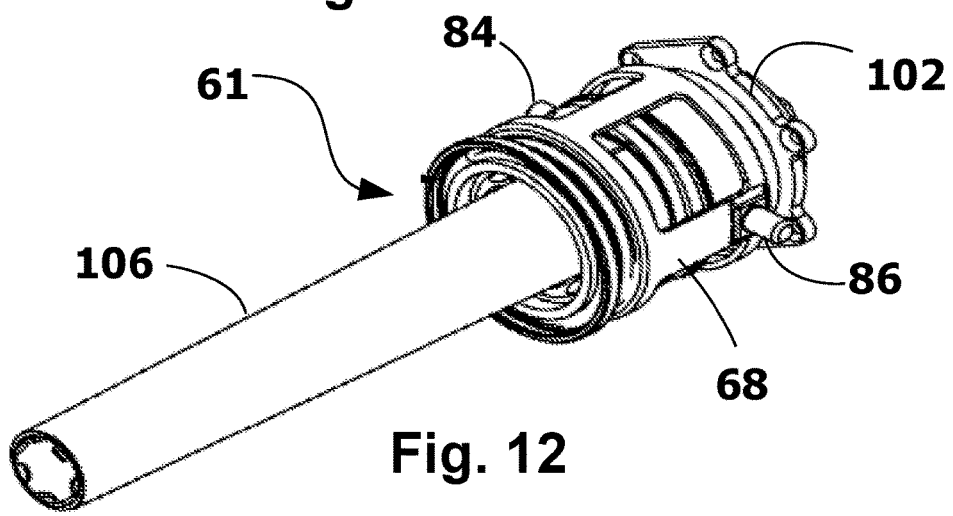
Fig. 12

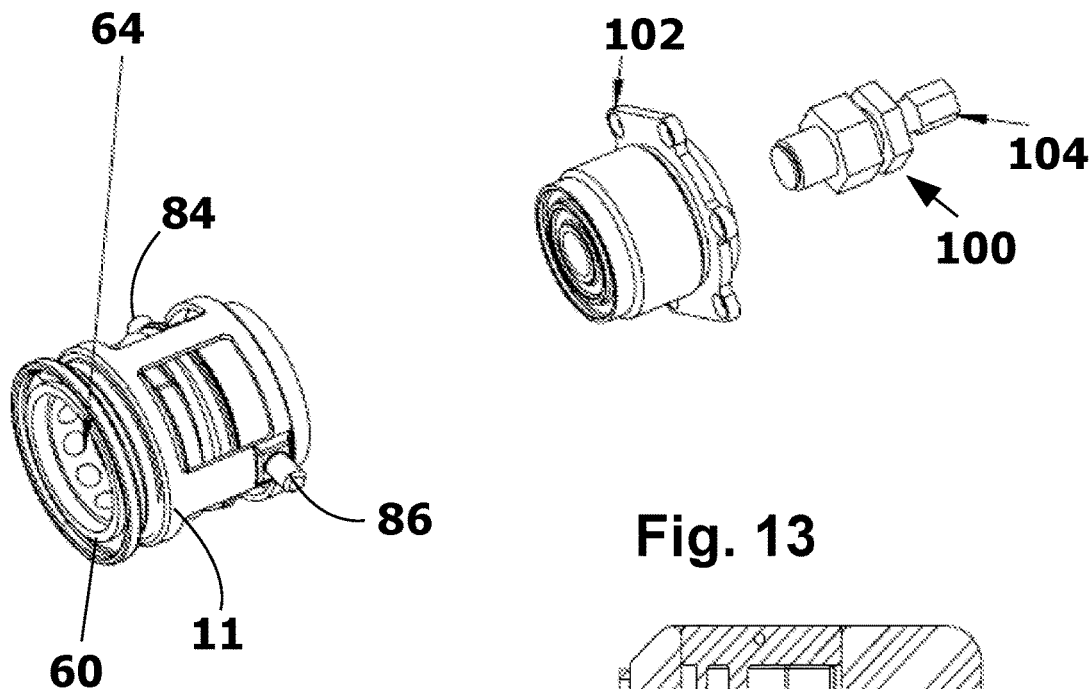
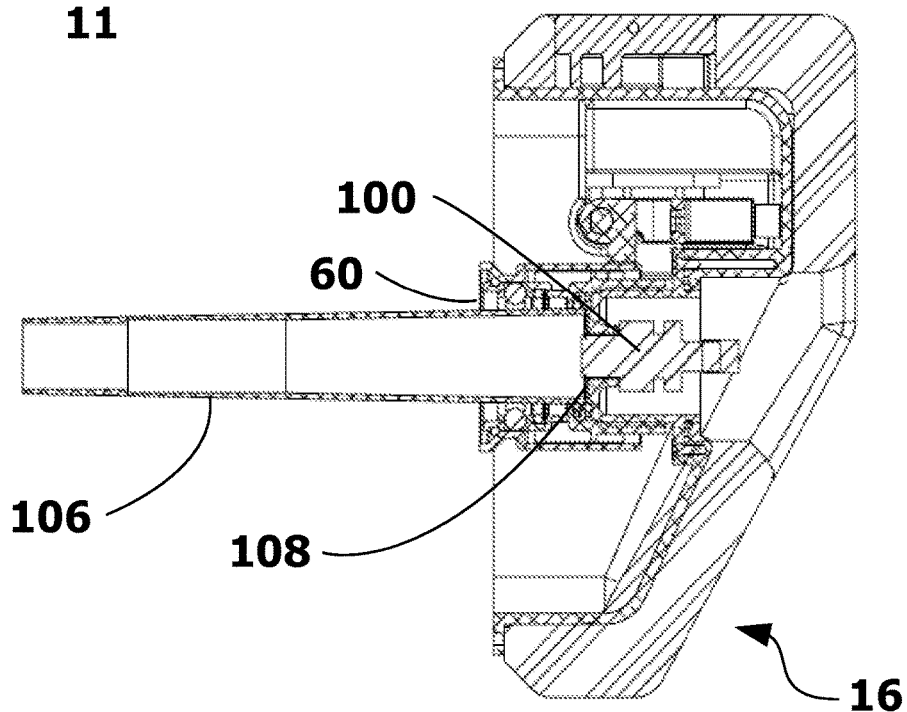
Fig. 13
Fig. 14

LAUNCHER FOR UNMANNED AERIAL VEHICLES

FIELD OF THE INVENTION

The present invention relates to launchers for unmanned aerial vehicles (UAV), and more particularly to UAVs' launchers tubes for stowing and launching.

BACKGROUND OF THE INVENTION

A pneumatic launcher is basically a device that uses compressed air (or some kind of gas) to launch something. Typically, there is an air chamber pressurized with air. All this air is released suddenly and this energy is what propels a projectile or any other object such as but not limited to unmanned air vehicle (UAV). There are many different types of pneumatic launchers. The air can be released by several different methods. One type of pneumatic launcher is a UAV pneumatic catapult launcher (hereafter catapult) is intended to accelerate UAVs to launch speed. The UAV pneumatic catapult typically include attachable rail parts, assembled length of couple of meters, carriage with pulling cable, battery operated air compressor with compressed air reservoir and pneumatically operating main valve with remote trigger. All components are packed into one or more cases for easy transportation and handling. Another type of pneumatic launcher is for example a pneumatic tube launcher.

Such issues of UAV tube launchers are addressed for example in U.S. Pat. No. 8,505,430 and U.S. Pat. No. 7,584,925.

U.S. Pat. No. 8,505,430 discloses an unmanned aerial vehicle (UAV) launch tube that comprises a tethered sabot configured to engage a UAV within a launcher volume defined by an inner wall, the tethered sabot dimensioned to provide a pressure seal at the inner wall and tethered to the inner wall, and wherein the tethered sabot is hollow having an open end oriented toward a high pressure volume and a tether attached within a hollow of the sabot and attached to the inner wall retaining the high pressure volume or attach to the inner base wall. A system comprising a communication node and a launcher comprising an unmanned aerial vehicle (UAV) in a pre-launch state configured to receive and respond to command inputs from the communication node.

U.S. Pat. No. 7,584,925 discloses a portable unmanned air vehicle and launcher system that includes a foldable unmanned air vehicle having a pressure tube; a launch gas reservoir for holding launch gas; a launch tube operatively connected to the launch gas reservoir and having a free end that is positioned in the pressure tube of the air vehicle; a free piston positioned within the launch tube; and a free piston stop to prevent the free piston from leaving the launch tube. A first portion of the launch gas in the launch gas reservoir is released into the launch tube and forces the free piston from an initial position to an end position at which the free piston is stopped by the free piston stop.

One object of the present invention is to provide an UAV launcher system that is transportable and can be carried by a one person. Another object of the present invention is to provide a system to launch a foldable UAV very quickly without the need to assemble parts for the UAV launching. Yet another object of the present invention is to provide a system to launch a foldable UAV even in a limited space and without the need of runway or rails for a UAV takeoff. Yet another object of the present invention is to provide a one person transportable UAV launcher with a foldable UAV placed inside the UAV launcher. Yet another object of the present invention is to provide a UAV launching system which is also used as a UAV protecting packaging when a foldable UAV is carried by a person as a back-pack. Conventional foldable UAVs are transported in pieces and assembled when needed. Another object of the present invention is to provide a transported fully assembled foldable UAV. Thus, does not suffer reliability problems associated with lost, broken or improperly assembled individual components.

SUMMARY OF THE INVENTION

The present invention relates to launchers for unmanned aerial vehicles (UAV), and more particularly to UAVs' launchers tubes for stowing and launching.

In accordance with an embodiment of the present invention there is provided a launcher for unmanned aerial vehicles (UAV), the launcher having a foldable UAV stowed within said launcher, the launcher includes, a launch tube configured as a UAV launcher and a UAV carrying case. The launcher further includes a pneumatic booster connected to said UAV for accelerating said UAV during launching phase. The launcher further includes a separation mechanism operated to permits separation of the booster from the UAV when the UAV leaves the launcher tube and to transfer the kinetic energy that is created from the pneumatic booster to the UAV in the launching phase. The UAV is propelled off of the launch tube by the booster that transmits thrust in the launch tube to the space below said booster. The UAV which is connected to the booster by said separation mechanism is pushed out of the launcher tube body in a preferably constant acceleration thereby leaves the launch tube, the booster is separated from the UAV by the separation mechanism and the UAV is automatically deployed. The UAV propellers are activated to propel the UAV and driven the UAV.

BRIEF DESCRIPTION OF THE DRAWINGS

The invention may be understood upon reading of the following detailed description of non-limiting exemplary embodiments thereof, with reference to the following drawings, in which:

FIG. 5 is a perspective rear view of a pneumatic booster in accordance with one embodiment of the present invention;

FIG. 6 is a perspective front view of the pneumatic booster that is shown in FIG. 5;

FIG. 7 is a perspective view of an air seal means in accordance with some embodiments of the present invention;

FIG. 10 is a perspective view of the connector assembly that shown in FIG. 8;

FIG. 11 is a perspective view of swing arms construction mechanism in accordance with some embodiments of the present invention;

FIG. 12 is a perspective view of a conic choke valve protruding outwardly from the socket of the connector assembly that is shown in FIG. 8;

FIG. 13 is a perspective exploded view showing some of the parts of the connector assembly that is shown in FIG. 8;

FIG. 14 is a side cross sectional view of the bottom portion of the launcher body, the connector assembly that is shown in FIG. 8 and the conic choke valve in accordance with the present invention;

The following detailed description of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION OF EMBODIMENTS OF THE INVENTION

Figure 1:
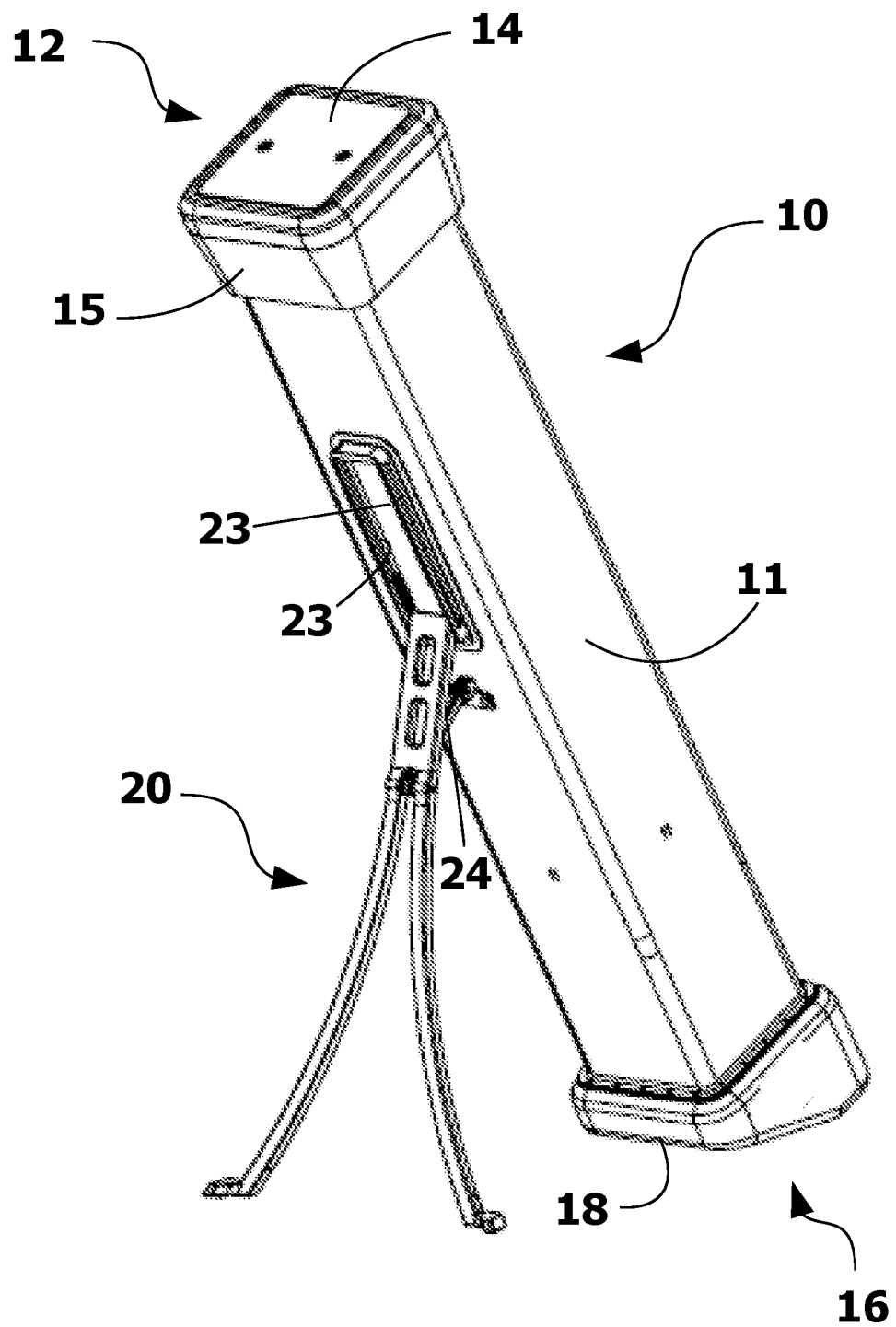
FIG. 1 is a perspective view of a UAV launcher in accordance with some embodiments of the present invention with an exemplary deployable bipod where the UAV launcher is ready to launch the UAV.

Referring first to FIG. 1, there is shown a launch tube 10 configured in accordance with some embodiments of the present invention as a UAV launcher and a UAV carrying case. The launch tube 10 includes a body 11 of square-shaped cross section. The body 11 is operatively used for storing the folded UAV and also is used as a launch rail for the UAV takeoff when the body 11 is positioned in a predetermined UAV launching angle and the UAV is ready for takeoff from body 11. The outer surface of body 11 of the launcher is also used as a protective transport tube. This tube, which totally encloses the UAV, prevents damage to the UAV structures when transported to and from one place to another.

In some embodiments of the present invention body 11 is made of a material that minimizes attenuation of electromagnetic waves such as but not limited to fiberglass layer. The thickness of the fiberglass body 11 is preferably less than one millimeter in order that the body will be light enough for carrying and minimizing attenuation of electromagnetic waves that comes to or from the UAV's antennas during maintenance or before flight. A shock absorber material such as but not limited to Polystyrene which totally encloses body 11 can be used to prevents damage to the UAV structures when transported to and from one place to another. Another layer of thin fiberglass encloses body 11 and the shock absorber for reducing the damages of shock absorber and body 11.

Figure 2:
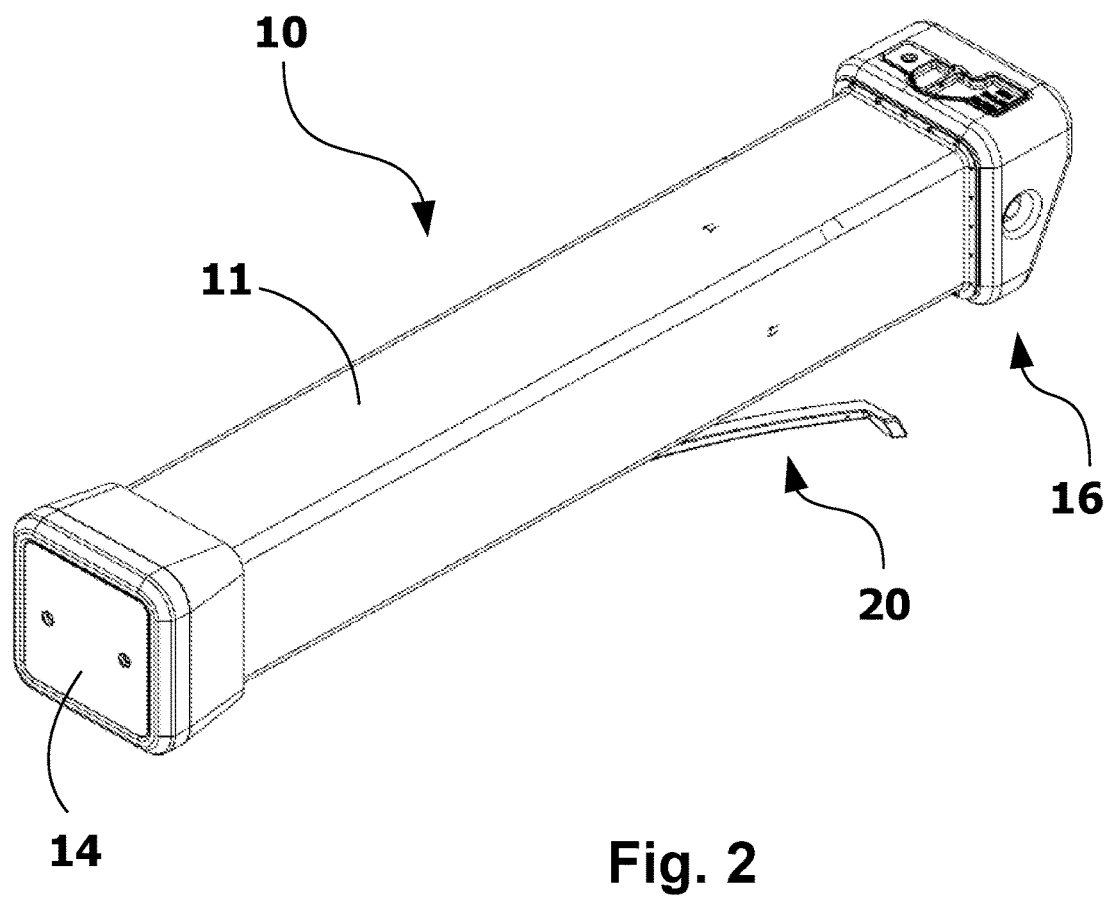
FIG. 2 is a perspective view of a UAV launcher in accordance with some embodiments of the present invention with deployable bipod in a stowed position where the UAV launcher is ready for transportation.

The launch tube 10 has a frontal opening 12 for takeoff and launching of the UAV that the launch tube body 11 contains. This opening is normally closed by a square-shaped cover 14. The front portion of the body 11 may include front bumper 15 which can be any protective rim, guard or pad, preferably made of rubber for absorbing shock and preventing damage to the UAV from bumping. The rear end portion 16 of the launching tube 10 presents a footing bumper structure 18. The launch tube 10 further includes foldable bipod attachment 20. The bipod 20 when is in a fully deployed position with the rear end footing structure creates a steady stand plane for the launch tube and provide stability along at least two axes (side-to-side and up-and-down). The bipod 20 is in fully deployed position when the launch tube 10 is in ready to launch position angle for example as illustrated in FIG. 1. The launcher 10 for example can be position in any predetermined selected launching angle when the bipod is in deployed position. The deployable bipod 20 may includes a hinged arm 24 hinged in one end to bipod 20 and the other end of the arm is hinged to the UAV body 11. The bottom portion of the body 11 may include rails 23 opposite to one another where the upper portion of the bipod can pivotally slide there between the rails 23. Arm 24 operatively limits the bipod to pivotally rotate up to the angle launch position. When the bipod is in a closed position for example as shown in FIG. 2 the bipod is folded approximately parallel to the launch tube body 11 allowing easier carrying of the UAV launcher containing the UAV by a person as a back-pack. Other suitable bipod or tripod known in the prior art can be used with embodiments of the present invention.

Figure 3:
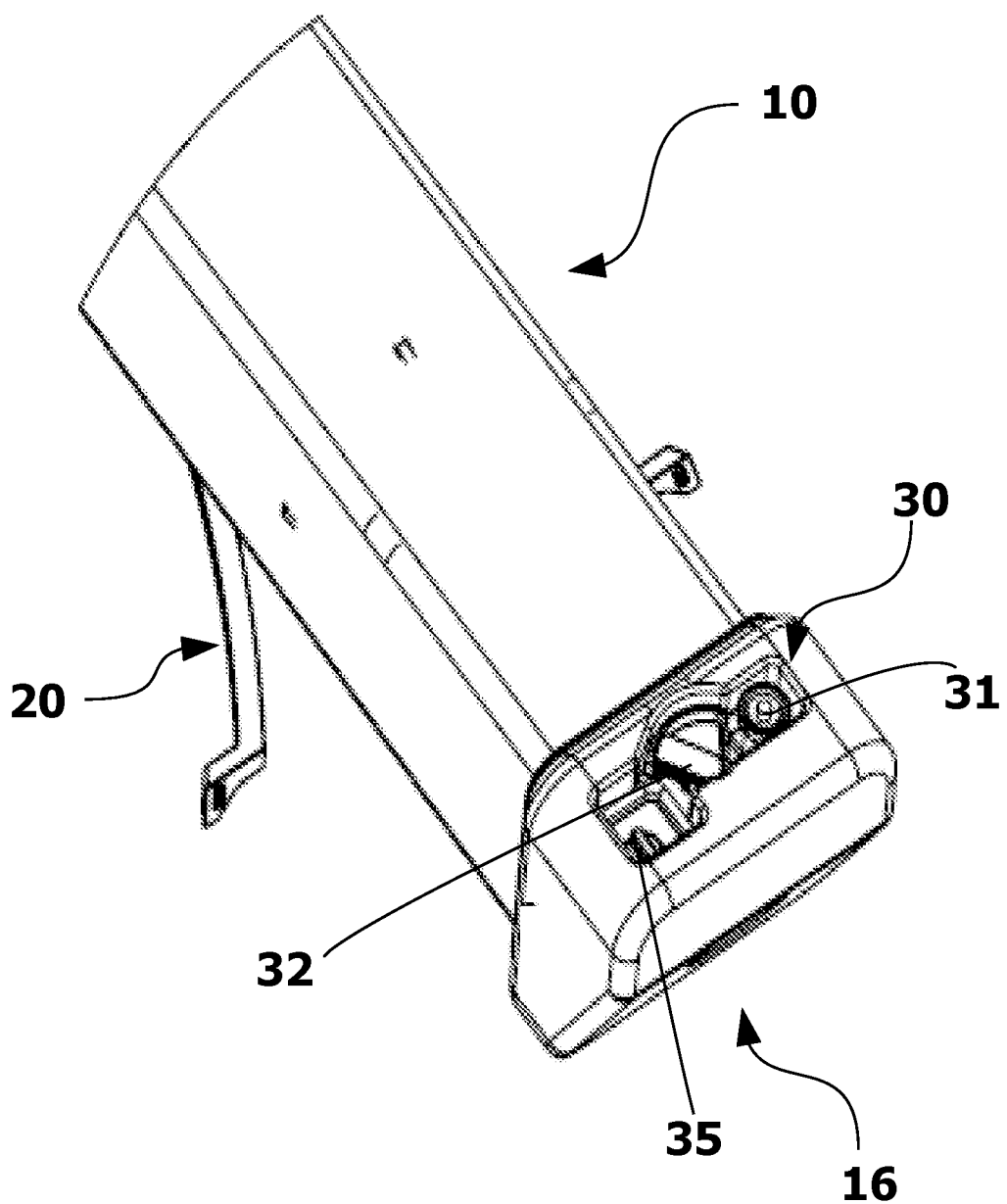
FIG. 3 is a perspective bottom portion sectional view of the UAV launcher that shown in FIG. 1.

Referring now also to FIG. 3, the rear end portion 16 may include a safety mechanism means 31 which is used to help prevent an accidental launching of a UAV in the pneumatic launcher tube 10 and helping to insure safer handling. The rear end portion 16 may further include a trigger 32 and/or a launching mechanism. The safety mechanism means 30 can include a safety pin 31 or a switch, a button or a lever that when set to the "safe" position, prevents the activation of the pneumatic launcher 10. The safety mechanisms 31 can be a block or latch that prevents the trigger 32 and/or launching mechanism from moving. The rear end portion 16 may further includes an electrical switch 35 for electrically activating the UAV electrical power source(s).

Figure 4:
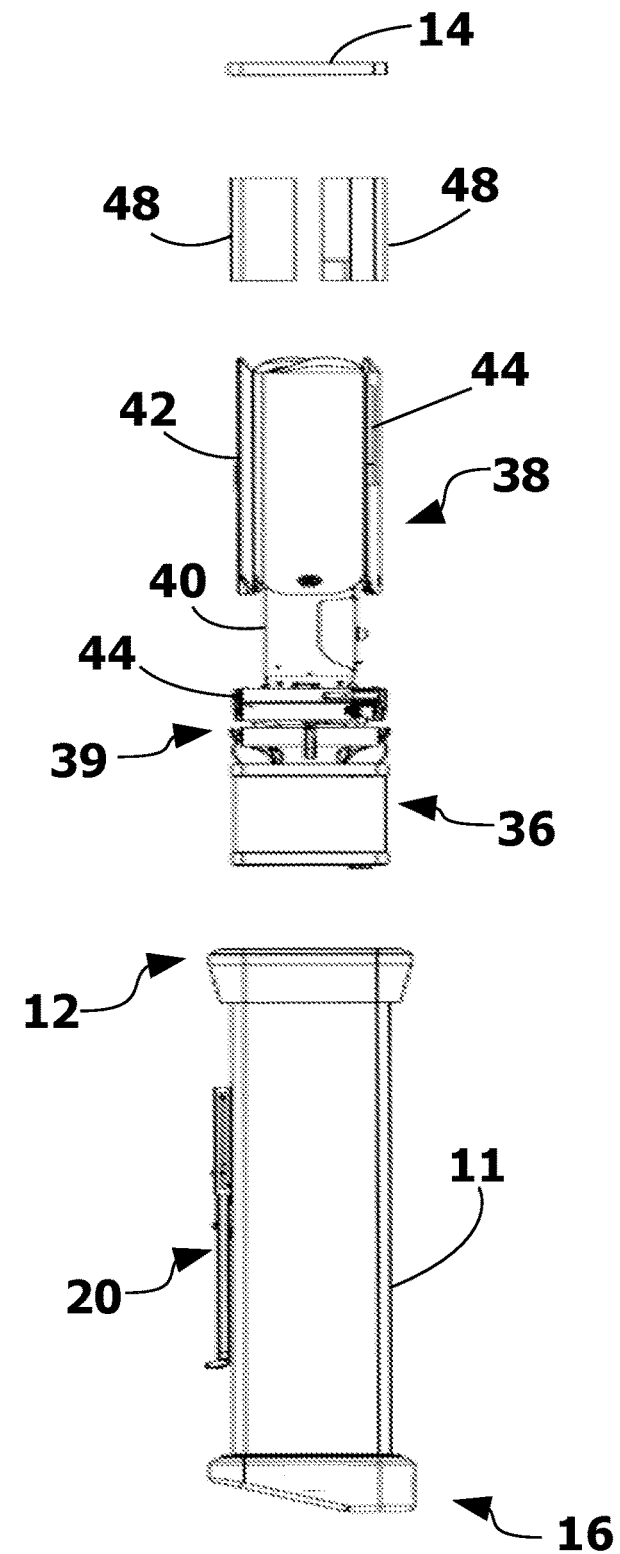
FIG. 4 is an exploded side view of the UAV launcher including a foldable UAV.

Referring to FIG. 4 there is shown an exploded view of the UAV launcher 10 with an exemplary foldable UAV stowed within the UAV launcher body 11. The UAV launcher 10 further includes a pneumatic UAV booster 36 which is typically a launch compressed gas reservoir that preferably holds compressed air at substantially different from the ambient pressure. In some embodiments of the present invention the booster 36 may hold other compressed gases or liquids. The UAV is propelled off of the launch tube 11 by the compressed air in booster 36 as will be describe later in more detail. The launcher 10 further includes a folded UAV 38. The booster 36 is used for accelerating the UAV 38 in the launching phase inside body 11. This booster 36 is mounted to the UAV 38. The booster 36 can however be released from the UAV 38 by a separation mechanism 39.

The construction of the separation mechanism 39, thus, which will be described later in more details permits separation of the booster 36 from the UAV 38 when the UAV 38 leaves the launcher body 11, which entails great saving in weight and kinetic energy. An exemplary of a folded UAV 38 is shown in FIG. 4. The UAV 38 includes a fuselage 40, foldable wings 42 and UAV elevators and rudders 44 which are foldable. The fuselage 40 is positioned centrically to the center axis of the launch tube body 11. Payloads and control electronics, not shown, for operating the elevators and rudder 44 included in the fuselage 40. Also include in the fuselage is a motor which may be a regular DC motor driving foldable propellers 46 when the propeller is in a full deployable position. The propeller has dimensions to fit into the tube body at least in some position particularly when the propeller is in a full folded position. The propellers are operatively and may automatically rotate when the UAV is launched and leaves the UAV body. The launcher 10 further includes sabot 48 configured to engage the UAV within the launcher volume defined by the inner walls of body 11. The sabot keeps the UAV centered in the inner walls of body 11, the sabot is further desirable to fill the undesirable but necessary gap between UAV and the inner walls of body 11. The sabot 48 generally includes one or more pieces held in place by a loose connection, not shown. When the sabot 48 reaches the end of body 11, the shock of hitting still air pulls the parts of the sabot away from the UAV 38, allowing the UAV 38 to continue in flight. In some embodiments of the present invention the sabot is loosely connected on the upper portion of foldable wings 42 in such a way that when the UAV is released, the sabot is further assists wings 42 to fully deploy in the initial flight stage when the UAV leaves body 11.

Referring to FIGS. 5 to 7, in the preferred embodiment of the present invention booster 36 includes a cylindrical body reservoir 50 that holds compressed air. The booster 36 further includes two pairs of squared frames 52 and 54 positioned in the front and rear ends of the booster respectively. Between each pair of frames, air sealing means 56 such as but not limited to sponge is positioned. The booster 36, the air sealing means 56 and the frames are positioned centrically to the center axis of the launch tube body 11. The squared-shaped frames 52 and 54 have squared-shaped cross section dimensions which are slightly smaller than the dimensions of the body's 11 square-shaped cross section and the dimensions of the frames are big enough such that there is a strong seal in association with the squared-shaped cross section sealing means 56 to trap propellant gases/compressed air behind the booster, and keep the UAV centered in the inner walls of body 11. It should be noted that in some embodiments of the present invention the booster may have other shapes and designs and the booster body is not limited to a cylindrical shape.

Figure 8:
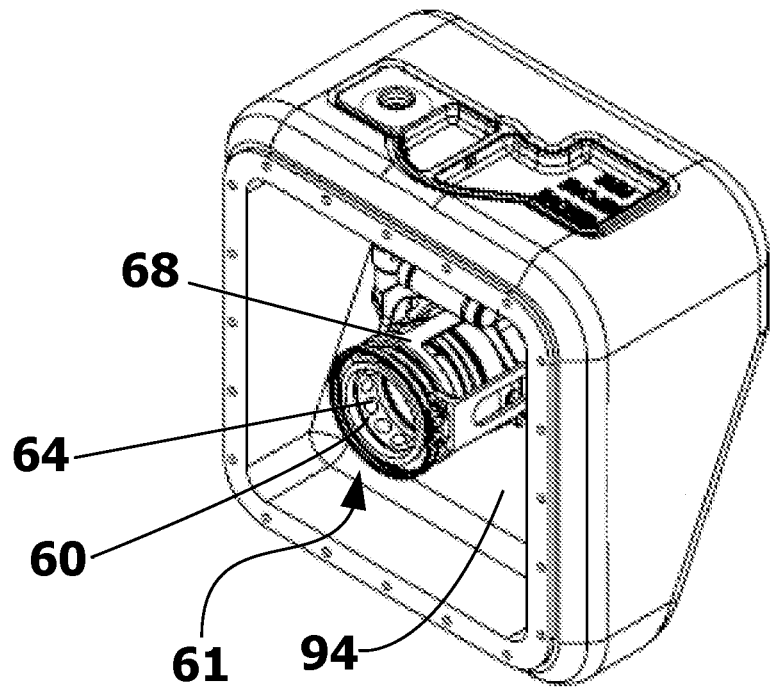
FIG. 8 is a perspective view of a complementary quick release connector assembly installed in the bottom portion of the launcher body.
Figure 9:
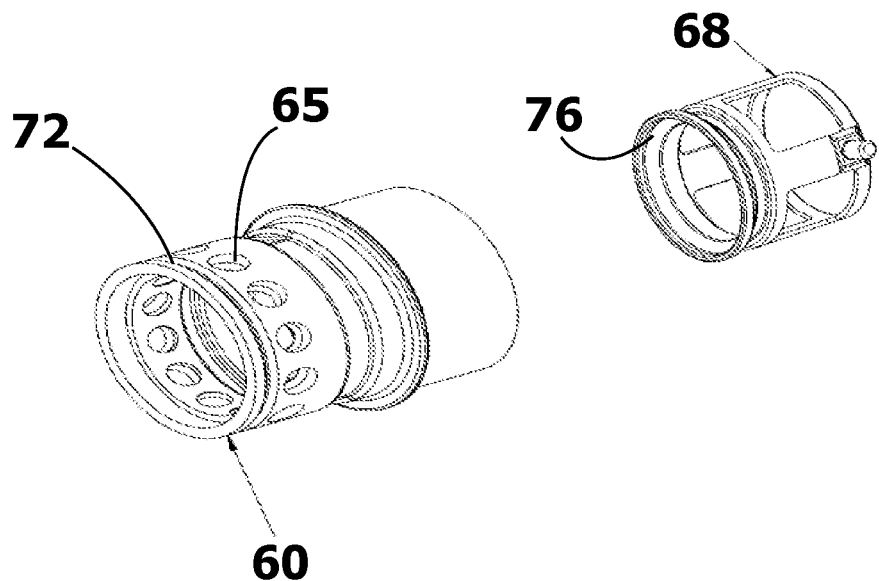
FIG. 9 is an exploded of some parts of the quick release connector assembly that is shown in FIG. 8.

At the bottom portion of booster 36 centrically to the center axis of the launch tube body 11 positioned a connector assembly 57 having an orifice 59. Referring also to FIGS. 8 and 9, the connector assembly 57 has a cylindrical portion 58 which fits freely into a socket 60, of a complementary quick release connector assembly 61, but with O-rings 62 for sealing the clearance between the cylindrical portion 58 and the sides of the socket/sleeve 60. The connector assemblies 57 and 61 are secured together by a plurality of balls, not shown, located at angular-spaced positions around the circumference of sleeve 60 on conic-shaped holes 65 and in position to engage a circumferential groove 66 in the cylindrical portion 58 of connector assembly 57. These balls are located in opening in the sleeve 60. The balls are held against outward displacement and forced to remain engaged in the groove 66 by a slide ring 68 which is movable longitudinally on the outside sleeve 60. This slide ring 68 is held by a conventional snap ring, not shown, located in a groove 72 in the outside surface of the sleeve 60. The upper portion of the slide ring 68, contacts with the snap ring to prevent the slide ring from coming off the sleeve 60. The slide ring 68 can be moved against the pressure of a conventional coil compression spring, not shown, to bring an end portion 76 of the slide ring 68 over the balls. This end portion 76 is of large enough diameter to permit the balls to move outwardly far enough to let the cylindrical portion 58 of the connector assembly 57 pass freely into and out of the socket 60. This detachable connection means 57 and 61 is conventional and is merely representative of detachable connecting means for securing the connector assembly to a complementary connector assembly.

Referring to FIGS. 10 and 11, complementary quick release connector assembly 61 further include swing arms construction mechanism 79 mechanically connected to trigger 32 and to the slidable sleeve 68. The end portion of arms 80 and 82 are shaped to be able to engage and fit with pins 84 and 86. The pins 84 and 86 are extended outwardly and perpendicularly to the outer surface of sleeve 68. When the trigger 32 is triggered, trigger 32 causes swing arms 82 and 80 to mechanically swing backwards around hinge 71 to a certain degree, enough to grab pins 84, 86 and push sleeve 68 backwards and thereby, balls 64 move outwardly far enough to let the cylindrical portion 58 of the connector assembly 57 pass freely out of the socket 60 by utilizing the force of the released pressurized air in the booster 38 through orifice 59. Swing arms construction mechanism 79 further include a safety ring 90, which is part of the safety mechanism, extending perpendicularly to arm 80. In a safety mode, the safety pin 31 is inserted through the ring 90 thereby, preventing from the swing arms construction mechanism 79 to swing and lock the trigger switch 32 from triggered and/or move. The safety pin 31 is housed in a safety pin housing 33 and a safety pin grabbing means 37 such as a flattened head is attached to the upper end of the safety pin 31 for enabling pulling the safety pin manually. When the safety pin 31 is pulled upwards enough such that pin 31 is no longer passes through the ring 90, the safety mechanism is thus set to "off" position and the trigger can be activated/moved and the arms can swing backwards when triggered and therefore the sleeve 68 is also able to slide backwards for releasing cylindrical portion 58 of the connector assembly 57 out of the socket 60 of connector assembly 61 as described above. A latching means not shown can be used to latch the safety pin 31 to be remains in the pulled up position after the safety pin 31 was pulled up. Support 92 can be used for attaching the quick release connector assembly 61 to the inner side 94 of the launcher rear portion 16 as shown for example in FIG. 8.

Referring to FIGS. 12 and 13, connector assembly 61 further includes an exemplary of valve stem 100 which opens to admit gas to reservoir 50 and is then automatically closed and kept sealed by the pressure in the reservoir 50 or a spring or both, to prevent gas from escaping. The valve stem 100 is housed in a valve housing 102. Referring also to FIG. 14, a valve stem 100 further includes valve cover 104. When the cover 104 is open by a user, a compressor, not shown, can be used for filling pressurized air into the reservoir 50 through the valve stem 100 and/or modifying the compressed air in the compressed gas reservoir 50 in order to maintain a desired working pressure in the compressed gas reservoir 50.

The connector assembly 61 further includes a choke valve 106 which in accordance of the present invention is a cone-shaped tube 106 that tapers smoothly from a flat base 108. The cone-shaped tube 106 is inserted inside sleeve 60. The rear portion of the cone-shaped tube 106 is positioned between valve housing 102 and sleeve 60. A conventional O-rings seals, not shown, are positioned between valve housing 102 and sleeve 60 for preventing compressed air to escape from reservoir 50. The cone-shaped tube 106 has a length size of approximately the length size of reservoir 50 as shown for example schematically in FIG. 15A. When connector assemblies 61 and 57 are connected to one another and cone-shaped tube 106 is inserted through orifice 59 of connector 57 inside reservoir 50, the rear portion of the conical-shaped tube 106 engages with the open of orifice 59. The choke valve 106 is used in accordance of the present invention to regulate the gas released from the pressurized gas reservoir 50 for the UAV 38 takeoff, when the connectors 57 and 61 are disconnected from one another. Because of the conical-shape of the choke valve 106 a constant or approximately constant gas pressure release is created in the launcher pneumatic mechanism when the two connectors 61 and 57 are released. In order to obtain a constant acceleration or approximately constant acceleration of the UAV along the body 11 there is a need to maintain a constant or approximately constant gas pressure in the increased chamber that is, the increased space below the booster 36 as the booster 36 moves upwards towards the upper portion of body 11. Because the booster 36 along with the UAV moves upwards in body 11 during the launching phase there is a need to release higher amount of pressurized gas from orifice 59 in order to maintain a constant or approximately constant air pressure in an increased chamber/space. This action is done by utilizing the conical-shaped tube 106. As mentioned above the conical-shaped tube 106 is positioned inside of the booster 36 and the gas that is released from the reservoir to the launcher body 11 is passed in the cut between the choke valve 106 and orifice 59. It should be noted that in some embodiments of the present invention the pressurized gas release in the increased chamber can be regulated during the launching phase to different gas pressure levels and choke valve 106 may not limited to conical-shape, other chock valve shapes can be used for regulating the gas pressure in the increased chamber.

Figure 15:
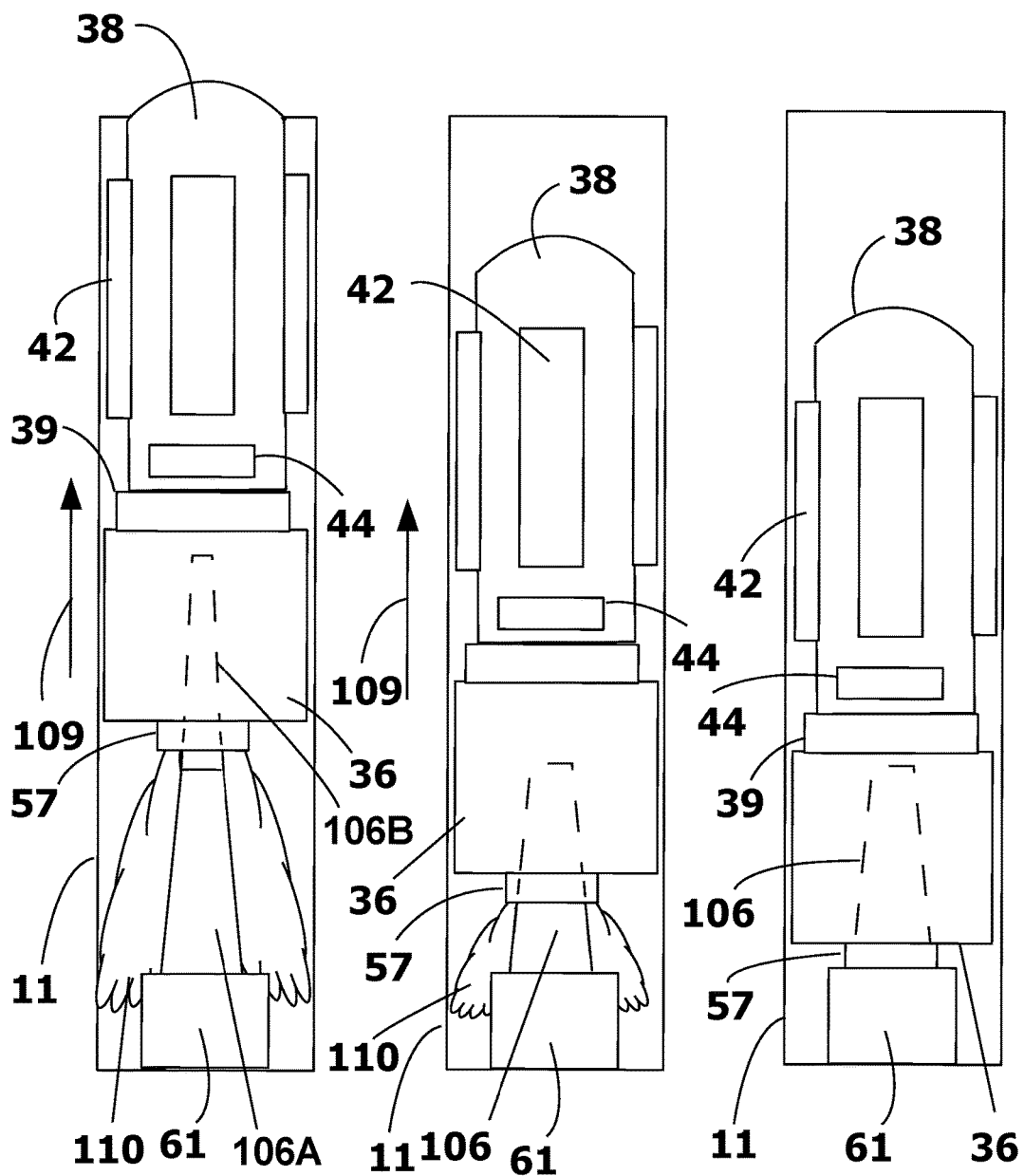
FIG. 15A illustrating schematically the stowed UAV in the launcher in accordance of some embodiments of the present invention before the UAV takeoff.
FIG. 15B illustrating schematically the UAV in the launcher in the early launch stage.
FIG. 15C illustrating schematically the UAV in the launcher in the early launch stage with sliding out conical-shaped choke valve tubes arranged in a telescopic configuration and sliding out from one another.

Referring also to FIGS. 15A to 15B, in FIG. 15A there is shown schematically a UAV 38 stowed in body 11, booster 36 is filled with compressed gas and the connector assemblies 57 and 61 are connected to one another, thereby preventing air to escape from booster 36. In the initial stage of the launching the gas ejection from booster 36, the wider side of the cone-shaped tube is positioned inside of orifice 59 of connector 57 and thus small amount of gas is released to the launcher body. With the progress of the booster and UAV ejection designated by arrow 109 as shown for example in FIG. 15B, the booster 36 moves forward and draws away from connector assembly 61. The cone-shaped tube that is connected to the connector assembly 61 stays in place in the bottom portion of body 11 and the cross section area between the orifice 59 of connector assembly 57 and the choke valve 106 where pressurized air/gas can escape is getting bigger due to the conical shape of the choke valve and thus more amount of gas 110 is released to the launcher body 11, to the space bellow booster 36. Thereby, the pressure of the gas in the growing cavity below booster bottom surface remains approximately equal during the UAV ejection from body 11. The approximately equal air/gas pressure stays that way during the entire movement of the UAV and its booster until the booster exit the launcher. Thereby, the booster and UAV acceleration remaining approximately equal during the entire launch with no acceleration spikes.

Figure 16:
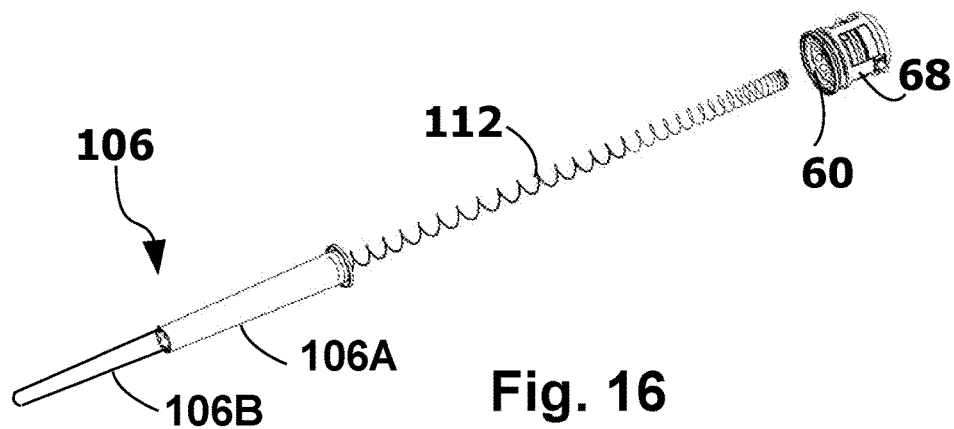
FIG. 16 is a perspective exploded view of the telescopic conic-shaped choke valve in accordance of the present invention.

Referring now to FIG. 15C and FIG. 16 in some embodiment of the present invention the choke valve 106 may include a plurality of conical-shaped tubes for example tubes 106A and 106B arranged in a telescopic configuration. When the connector assemblies 61 and 57 are connected to one another the cone-shaped telescoping tubes 106A and 106B are in a collapsed position. When connectors 61 and 57 are disconnected from one another the collapsed telescoping tubes 106A and 106B are automatically sliding out from one to another, lengthening conical-shaped tube formed from its rest/collapsed state conical-shaped tubes 106A and 106B. The automatic sliding movement is done by a spring 112 compressed within the collapsible telescoping tubes and is automatically released when the connectors 61 and 57 are disconnected. Thereby, the released spring provide force for the telescoping tubes 106A and 106B to slide of from one to another. This configuration allows more time for the chock valve 106 to release constant amount of compressed air from booster 38 and thus to maintain a constant acceleration of the UAV along the launching runway of body 11.

Figure 17:
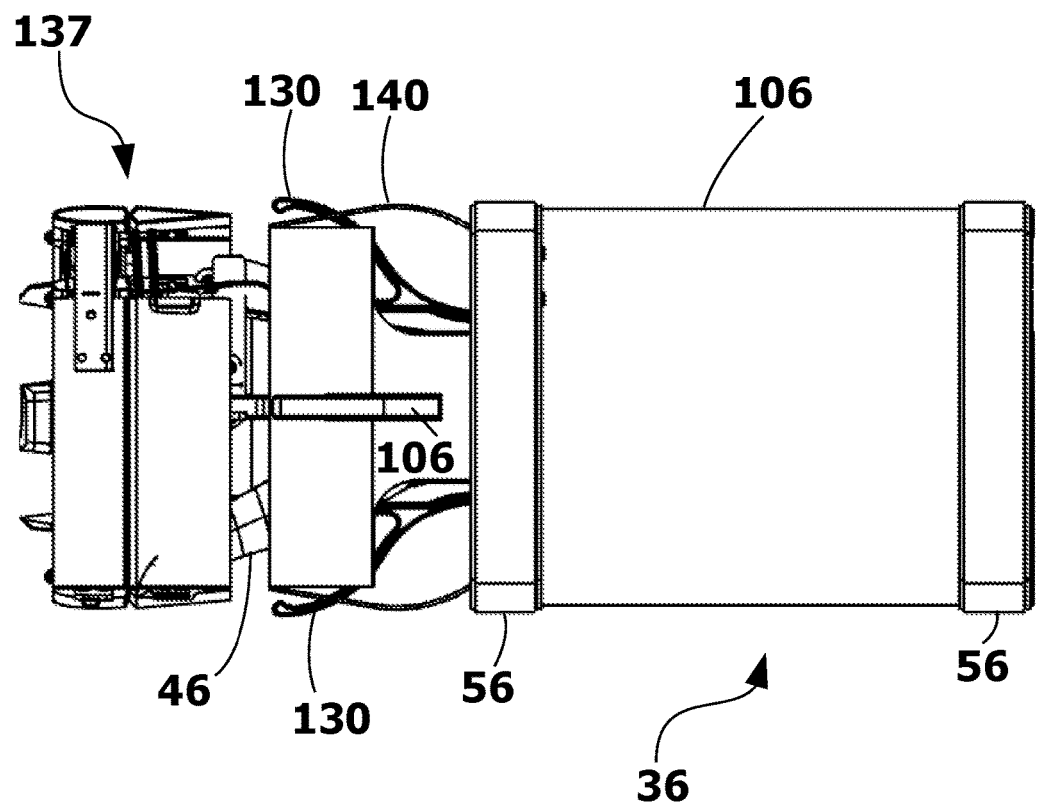
FIG. 17 is a side view of the booster and the separation mechanism and the UAV tail section, where the separation mechanism grabs the UAV tail section in accordance of the present invention.
Figure 18:
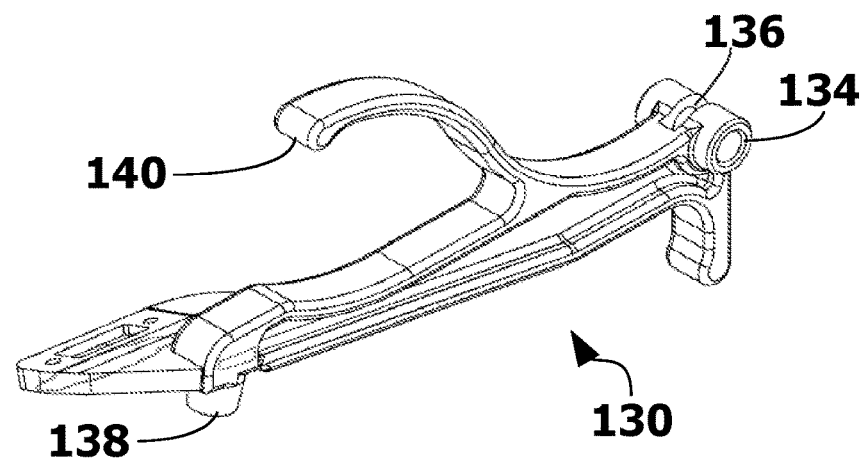
FIG. 18 is one of a plurality of tail UAV grabber arms in accordance of the present invention.
Figure 19:
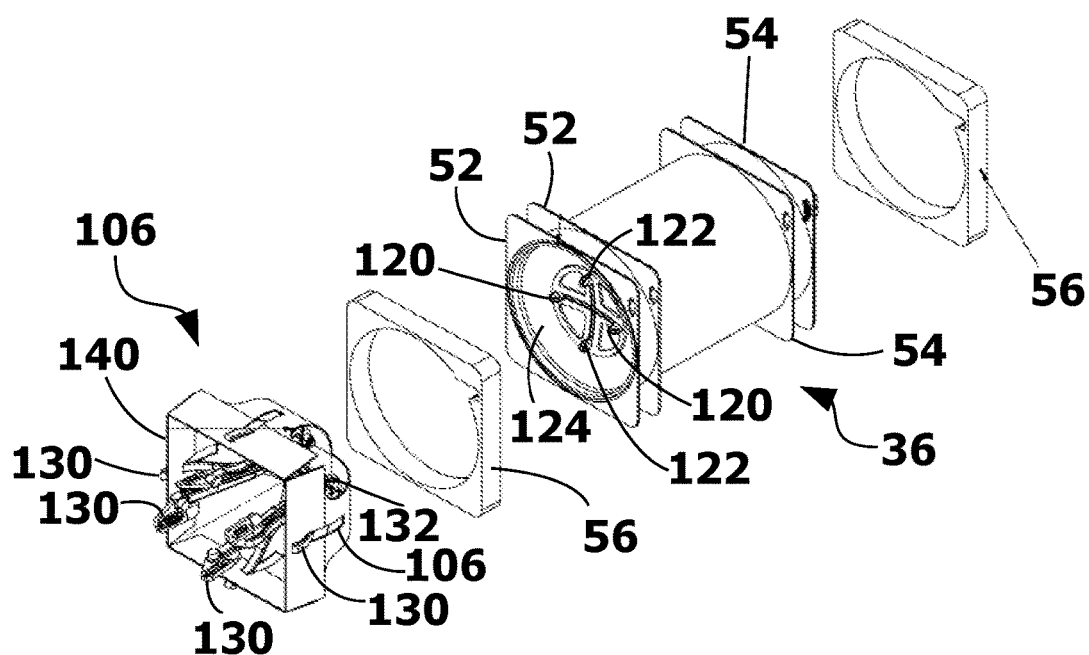
FIG. 19 is an exploded view showing the booster and the separation mechanism including the booster air brakes in accordance of the present invention.

Referring to FIG. 6 and FIGS. 17 to 18, in the upper portion of booster 36 are attached two pairs of rings members 120 and 122. Each pair of rings positioned opposite to one another and each of the ring members are positioned perpendicular to the upper surface 124 of booster 36. The upper portion of booster 36 further includes tail UAV grabber arms 130 each of them secured in one end by a hinge 132 to each of the rings respectively. The hinge 132 includes the following hinge members, ring members 120 and 122, a hinge rode member, not shown, and a pivot tube 134. The pivot tube is extended from the rear portion of arm 130 and has a groove 136 positioned preferably in the middle of the tube 134. Groove 136 receives the respective ring 120, 122 and a respective hinge rod is being inserted through tube 134 and the respective ring 120, 122. This arrangement allows arms 130 to be pivotally attached to the upper surface 124 of the booster 36 and thus, each arm 130 has a certain degree of freedom to rotate around the respective axis of the hinge rod member. At the upper portion of UAV tail grabber arm 130 extends downwardly towards the UAV body a protruded element 138. In the tail section 137 of the UAV disposed grooves, not shown, that receive and/or engaged with the protruded elements 138 when the UAV 38 is stowed in the UAV launcher body 11. In order that the protruded elements 138 will remain caught in the grooves the grubber further includes upwardly diagonal support arm 140 extended from arm 130 and is constructed to engage with the inner surface of body 11. This arrangement prevents arms 130 to rotate when the UAV is installed within body 11. The main purposes of the UAV tail grubber 130 are, one to transfer the kinetic energy that is created from the pneumatic mechanism to the UAV and the second purpose is to protect the UAV motor and/or other parts position at the UAV tail, by keeping enough distance between the UAV 38 and the booster 36. The separation mechanism 39 further includes an air brakes means 140. The air brakes means is preferably made of a flat composite material that has the property to bent when applying force and to return to its flat position when the bending force discontinuous or stops. The air brakes means 140 has two main purposes; one for disengaging the tail grabbing arms 130 and booster 36 from the UAV tail section 137 after the UAV 38 is launched and leaves the launcher 10. The second purpose, the shock of the air break means 140 hitting still air pull the grabbing arms 130 away from the UAV body. The air brakes means 140 is opened to increase drag and thus the booster flight speed decreases faster relatively to the UAV speed and the booster 36 is drawn away from the UAV. The launcher 10 may further include UAV technician service connector, not shown. This service connector can supply voltage to the UAV that is stowed in body 11 from external power supply that is not the internal power supply in the UAV. This connector my further includes electrical communication channel through which software updates, UAV electrical measurements and built-in self test and other maintenances can be established while the UAV 38 remains in body 11.

The UAV is launched as follows. The booster 38 transmits thrust to the space below booster 38 in body 11 Thus, the UAV which is connected to the booster 38 by separation mechanism 39 is pushed out of the launcher tube body 11 in a constant acceleration thereby leaves the launch tube 11. As soon as the UAV is launched the aerodynamic control surfaces 44 and wings 42 of the UAV are fully available for control as soon as the booster 36 and the separation mechanisms 39 are separated from the UAV. However, as soon as the UAV leaves the launch tube 11 wings biased means, not shown, such as spring-biased hinges, causes the wings 42 to deploy in a full deployable position and whereupon latches lock the deployed wings 42 in position. For example, after a turn by approximately 90 degrees, the wings 42 are fully deployed sideways. While the wings biased means initiate the deployment of the wings 42, the deployment continuous as a result of inertia and air resistance. As the booster 36 and the separation mechanism 39 separate from the UAV and draw away from the UAV by the deploying of the air brakes 140 and following the launch, thrust development of the booster will decline causing the booster and the separation mechanism 39 to drops off, the UAV continuous and foldable propellers 46 of the UAV are deployed and the propeller motor is activated to propel the UAV propellers and driven the UAV.

In accordance with some embodiments of the present invention a single launch platform, not shown, can be used for launching a plurality of foldable UAVs from a single launch platform or vehicle. Each pre-air pressed and launch ready UAV is individually launch out of it launch tube by compressed air in accordance of the present invention as described above. The UAV launcher configuration and the foldable UAV configuration allow for automatic deployment of wings and tails sections surfaces of the UAV after launch to transform the UAV into flight configuration.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

The invention claimed is:

1. A launcher for unmanned aerial vehicles (UAV), said launcher having a foldable UAV stowed within said launcher, said launcher comprising:
   a launch tube configured as a UAV launcher and a UAV carrying case;
   a pneumatic booster having a pressurized gas(es) reservoir, said booster is connected to said UAV for accelerating said UAV during launching phase;
   a separation mechanism operated to permits separation of said booster from said UAV when said UAV leaves said launcher tube and to transfer the kinetic energy that is created from said pneumatic booster to said UAV in said launching phase;
   wherein, said UAV is propelled off of said launch tube by said booster that transmits thrust in the launch tube to the space below said booster,
   whereby, said UAV which is connected to said booster by said separation mechanism is pushed out of the launcher tube body thereby, leaves the launch tube, said booster is separated from said UAV by said separation mechanism and said UAV is automatically deployed, UAV propellers are activated to propel said UAV and driven said UAV.

2. A launcher according to claim 1, wherein said booster further comprising a booster connector assembly, said booster connector assembly having an orifice and a cylindrical portion which fits freely into a socket of a complementary quick release connector assembly positioned at the bottom portion of said launcher tube, said cylindrical portion further comprising O-rings for sealing the clearance between the cylindrical portion and the sides of a socket of said complementary quick release connector assembly, said connector assemblies are secured together by a plurality of balls located at angular-spaced positions around the circumference of a sleeve on conic-shaped holes and in position to engage a circumferential groove in said cylindrical portion of said booster connector assembly, said balls are held against outward displacement and forced to remain engaged in the groove by a slide ring which is movable longitudinally on the outside sleeve, said slide ring can is moved against the pressure of compression spring, to bring an end portion of said slide ring over said balls, this end portion is of large enough diameter to permit said balls to move outwardly far enough to let said cylindrical portion of said connector assembly pass freely into and out of said socket.

3. A launcher according to claim 2, wherein said complementary quick release connector assembly having a choke valve for regulating the gas released from the said pressurized gas reservoir for said UAV takeoff when said connectors assemblies are disconnected from one another.

4. A launcher according to claim 2, wherein said choke valve is a cone-shaped tube that tapers smoothly from a flat base; said cone-shaped tube is inserted inside said sleeve; the rear portion of said cone-shaped tube is positioned between a valve housing and said sleeve; said cone-shaped tube has a length size of approximately the length size of said reservoir, and
   wherein, when said connector assemblies are connected to one another and said cone-shaped tube is inserted through orifice of said connector inside said reservoir, the rear portion of said conical-shaped tube is engaged with the open of said orifice; because of the conical-shape of said choke valve, when said two connectors are released gas is released below said booster and remains approximately constant during said UAV launching phase.

5. A launcher according to claim 3, wherein said choke valve comprises a plurality of conical-shaped tubes arranged in a telescopic configuration; when said connector assemblies are connected to one another said conical-shaped telescoping tubes are in a collapsed position; when said connectors assemblies are disconnected from one another the collapsed telescoping tubes are automatically sliding out from one to another, lengthening conical-shaped tube formed from its rest/collapsed state conical-shaped tubes.

6. A launcher according to claim 1, wherein said separation mechanism having UAV grabber arms hinged attached to the upper portion of said booster which is used for transfer the kinetic energy that is created from said pneumatic mechanism to said UAV and to protect the UAV motor and/or other parts position at said UAV, by keeping safety distance between said UAV and said booster.

7. A launcher according to claim 1, wherein said separation mechanism having an air brakes means used for disengaging said grabbing arms and said booster from said UAV after the UAV is launched, said air brakes means is opened to increase drag and thus said booster flight speed decreases faster relatively to said UAV speed and said booster is drawn away from said UAV.

8. A launcher according to claim 1, wherein said launcher further having service connector.

9. A launcher according to claim 1, wherein said launcher further having electrical communication channel through which software updates, UAV electrical measurements and built-in self test and other maintenances can be established while the UAV remains in launcher body.

10. A launcher according to claim 7, wherein said air brakes means is made of a flat composite material that has the property to bent when applying force and to return to its flat position when said bending force discontinuous or stops.

11. A launcher according to claim 5, wherein said collapsible telescoping tubes further having a spring for automatic sliding movement of said telescoping tubes when said connectors are released from one another; thereby, the released spring provide force for the telescoping tubes to slide off from one to another; this configuration allows more time for the chock valve to release amount of compressed air from said booster to maintain acceleration of said UAV along the launching runway of said launcher body to remains approximately constant.

12. A launcher according to claim 1, wherein said launch tube having a body of square-shaped cross section; said body is operatively used for storing said folded UAV and also is used as a launch rail for said UAV takeoff when said body is positioned in a predetermined UAV launching angle and the UAV is ready for takeoff from said body.

13. A launcher according to claim 1, wherein said launcher having at least one bumper for absorbing shock and preventing damage to said UAV from bumping.

14. A launcher according to claim 1, wherein said launcher further having a footing bumper structure positioned in the rear portion of said body and a foldable bipod attachment wherein when said bipod is in a fully deployed position with the rear end footing structure creates a steady stand plane for the launch tube.

15. A launcher according to claim 1, wherein said launcher is carried by a person as a back-pack.

16. A launcher according to claim 1, wherein said launcher further comprising a safety mechanism means which is used to help prevent an accidental launching of said UAV in said launcher tube.

17. A launcher according to claim 1, wherein said launcher further comprising a trigger launching mechanism.

18. A launcher according to claim 1, wherein said launcher further comprising an electrical switch for electrically activating the UAV electrical power source(s).

19. A launcher according to claim 1, wherein said pneumatic booster is a launch compressed gas reservoir that holds compressed air/gas.

20. A launcher according to claim 1, wherein said launch tube further comprising said sabot configured to engage said UAV within the launcher volume defined by the inner walls of said launch tube, said sabot is loosely connected to the UAV's wings and when said sabot reaches the end of said launch tube, said sabot is assist for deploying the UAV's wings; the shock of hitting still air pulls the parts of said sabot away from said UAV.

21. A launcher according to claim 1, wherein said booster further comprising at least one pair of frames between each pair of frames, air sealing means is positioned trap propellant gases/compressed air behind the booster, and keeps the UAV centered in the inner walls of said launch tube.

22. A launcher according to claim 2, wherein said complementary quick release connector assembly further comprising swing arms construction mechanism mechanically connected to said trigger and to said slidable sleeve, the end portion of said arms are shaped to be able to engage and fit with pins and said pins are extended outwardly and perpendicularly to the outer surface of said sleeve, and wherein When said trigger is triggered, said trigger causes said swing arms to mechanically swing backwards around a hinge to a certain degree, enough to grab said pins and push said sleeve backwards and thereby, said balls move outwardly far enough to let the said cylindrical portion of said connector assembly pass freely out of the said socket by utilizing the force of the released pressurized air in said booster through said orifice.

23. A launcher according to claim 22, wherein said swing arms construction mechanism further comprising a safety ring, which is part of the safety mechanism, extending perpendicularly to one of said arms, wherein in a safety mode, said safety pin is inserted through said ring thereby, preventing from said swing arms construction mechanism to swing and lock said trigger switch from triggered and/or move; When said safety pin is pulled upwards enough such that said pin is no longer passes through said ring, said safety mechanism is thus set to "off" position and said trigger can be moved and said arms can swing backwards when triggered and therefore said sleeve is also able to slide backwards for releasing said cylindrical portion of said connector assembly out of said socket.

24. A launcher according to claim 1, wherein said complementary quick release connector assembly further having a valve stem which opens to admit gas to said reservoir and is then automatically closed and kept sealed by the pressure in said reservoir or a spring or both, to prevent said gas from escaping.

25. A launcher according to claim 1, wherein a single launch platform is used for launching a plurality of foldable UAVs from said single launch platform.

26. A launcher according to claim 1, wherein said body is made of a material that minimizes attenuation of electromagnetic waves such as but not limited to fiberglass, the thickness of said fiberglass body is preferably less than one millimeter in order that said body will be light enough for carrying and also for minimizing attenuation of electromagnetic waves that comes to or from the antennas of said UAV during maintenance or before flight.

27. A launcher according to claim 1, wherein said foldable UAV is pushed out of the launcher tube body in approximately constant acceleration.

* * * * *